(12) United States Patent
MacDonald et al.

(10) Patent No.: US 7,706,493 B2
(45) Date of Patent: Apr. 27, 2010

(54) SYSTEM AND METHOD OF TRANSMITTING DATA WITHIN A THREE-WIRE NETWORK

(75) Inventors: Virginia N. MacDonald, Rockwall, TX (US); Joe R. Powell, Garland, TX (US)

(73) Assignee: Lennox Industries Inc., Richardson, TX (US)

( * ) Notice: Subject to any disclaimer, the term of this patent is extended or adjusted under 35 U.S.C. 154(b) by 799 days.

(21) Appl. No.: 11/558,258

(22) Filed: Nov. 9, 2006

(65) Prior Publication Data
US 2008/0112492 A1 May 15, 2008

(51) Int. Cl.
*H04L 7/00* (2006.01)
(52) U.S. Cl. .................................. 375/355; 375/259
(58) Field of Classification Search ............... 375/354, 375/355, 359, 360, 259
See application file for complete search history.

(56) References Cited

U.S. PATENT DOCUMENTS 4,706,184 A * 11/1987 Schutten et al. ............. 363/157
2002/0171544 A1* 11/2002 Schmurr ..................... 340/538

* cited by examiner

*Primary Examiner*—David B Lugo

(57) ABSTRACT

The present invention is an improvement to previously known systems for controller area networks and the method of communicating across such networks. The system and method introduces interpolated time markers to provide higher resolution bit container, for communicating data bits across the data bus of a three-wire controller area network. The interpolated time markers allow devices on a controller area network to effectively double tie amount of bandwidth available for communication and can in some cases even further increase the bandwidth beyond a factor of two.

12 Claims, 3 Drawing Sheets

SYSTEM AND METHOD OF TRANSMITTING DATA WITHIN A THREE-WIRE NETWORK

BACKGROUND OF THE INVENTION

1. Field of the Invention

The present invention relates to an improved method and system for communicating across a controller area network at a higher data rate while providing power to a plurality of devices wherein the controller area network uses only three wires to provide both power and data to the devices on the network.

2. Description of the Related Art

Communication between devices enables multiple devices to operate together thereby enhancing the individual devices operating capability. For example, computers across a network can communicate with one another, even around the world, providing information and sharing resources, thereby enhancing the ability of any single computer connected to the network to accomplish tasks. Increasingly, all devices are being networked together to provide synergy and enhanced communication between the devices increasing the effectiveness of each device on the network. Many of these networks are limited to small scale networks known as controller area networks. Such networks may be limited to spaces such as within a vehicle, home, or office. Regardless of the size of the network, the effectiveness of a network in allowing the connected devices to interoperate with maximum efficiency is inherently limited by the bandwidth, or communication speed, across the network. Depending on the needs of the devices connected to the network, limited bandwidth may reduce the amount of data communicated between the devices. In fact, as the number of devices on the network increases, the bandwidth needed by the devices also increases, sometimes exponentially. An overloaded network with a small bandwidth may eventually reach a point where the devices on the network cannot operate effectively with one another.

The speed of communication across the network is generally measured in the number of bits per second, bps, transmitted across the data bus. Increasing the number of bits per second that can be transmitted across the data bus increases the amount of information that can be communicated. Early modem technology operated at only 120-300 bits per second which allowed only a small amount of real-time data to be communicated across the data link. However, newer communication networks, such as Ethernet for connecting homes feature much higher communication rates ranging from 10 million bits per second to 1 billion bits per second or more across the data bus. These advanced communication networks, however, require sophisticated hardware and software to achieve the data rates disclosed and are not suitable for simpler systems because of the increased cost and overhead.

One specific type of communication system known in the art is an HVAC (heating, ventilation, air conditioning) communication system developed by Honeywell and known by the trade name Enviracom™. The Enviracom™ system has been put forth by Honeywell as a method of communicating between HVAC products, including thermostats, furnaces, cooling units and control panels, to enhance the effectiveness of the HVAC system within a particular structure or small group of structures. The advantage to this system is that the protocol and method of communicating across the network are well-known in the art and publicly disclosed. A growing number of HVAC products incorporate the Enviracom™ communication system to increase the effectiveness of the products and allow some interoperability between products of different manufacturers.

In the prior art system, a number of HVAC devices, whether thermostats, controllers, furnaces, are connected to the network with three wires. Two of the three wires provide a limited power supply to the connected devices. In the basic, well-known implementation, the two power lines provide an alternating current power source across the power lines to the devices which can be used to power the electronics of the connected device. More importantly, the third line, a data line is used to transmit and receive data across the network. The three lines, two power and one data, can be connected between each device in a variety of different configurations, including star topology, daisy-chaining, or a combination of the two.

The network of all the data lines between the individual devices on the network forms a data bus wherein any device on the network can communicate with each and every other device connected elsewhere on the network, even if the two communicating devices are located on opposite sides of the network topology. This type of communication network structure is well-known in the art and is not limited to the Enviracom™ system nor the present improvement.

Generally speaking, the Enviracom™ communication system provides 24 volts of alternating current power across the power lines at a frequency of 60 Hz. This corresponds to the natural frequency of the electrical grid in North America eliminating the need to modulate the frequency of the power lines which is more complicated than stepping down the voltage from ~120 Vac to 24 Vac. While primarily providing a power signal across the controller area network, the power lines also serve a secondary purpose in providing a pseudo-clock signal of approximately 120 Hz for use in reading the data line. In a 60 Hz sinusoidal waveform, such as that transmitted across the power lines, the sinusoidal signal has two zero-crossings per cycle. In the communication system, the zero-crossing can be used as a clock for regulating the data transmitted across the data bus. The 120 zero-crossings per second of the 60 Hz allows for 120 bits of data to be communicated across the data bus per second, or one bit of data communicated between each zero-crossing in the previously known implementation.

The data bus also features a sinusoidal signal that is also at 60 Hz, but can feature a lower maximum and minimum voltage depending on the physical dimensions of the network. In between each zero-crossing of the power signal, the data bus is modulated to communicate the appropriate bit across the data bus. For example, if the data line contains a high-amplitude signal then a 1 bit is being transmitted across the bus, while if the data line contains a low-amplitude or even zero-amplitude waveform within the bit container then a 0 bit is being transmitted across the bus. This simple form of communication within a controller area network is extremely effective when communicating small amounts of data across the bus and will be better explained with reference to the figures and detailed description.

Although the controller area network communication system does allow for communication across the network with only a minimal amount of wires providing both power and data to the devices on the network, the practical limitation of using 60 Hz alternating current for the power limits the effective bandwidth of the communication system to 120 bps if using the simple modulation previously described. It would be greatly advantageous to provide an improvement to the current system for increasing the bandwidth of the controller area network without requiring expensive or sophisticated hardware changes. It would be desirable if this communication system used similar forms of amplitude modulation without increasing the complexity of the system thereby allowing current hardware to implement the technique with only minor software modifications.

In view of the aforementioned shortcomings, an improved system and method for communicating across a controller area network providing a higher bandwidth than is currently taught is needed.

SUMMARY OF THE INVENTION

The present invention addresses the aforementioned limitations and disadvantages of the prior art communication system by introducing techniques and methods that may be implemented to increase the throughput of the communication system. The present invention utilizes the zero-crossings of the pair of power lines of a three-wire communication system as demarcation points and further interpolates additional time markers for the communication system to allow for additional bit containers to be introduced into the system.

The system may be implemented with a plurality of devices connected to a controller area network. Each device on the controller area network is connected to one another across a bus comprised of a pair of power lines and a data line. The devices can be of any type, but are commonly devices for an HVAC system such as thermostats, temperature controllers, furnaces, fans, etc. Generally, a single device on the network provides the power over the power lines for the remainder of the system. The arbitration of the data bus comprised by the data lines is managed according to any method known in the art and is not affected by the implementation described herein.

In one embodiment of the invention, an alternating signal on the data line is rectified with respect to a neutral line wherein the rectified signal is used to compute the bits being transmitted across the data bus. The rectified signal is then measured by the device on the controller area network using a first and second time marker to demarcate the bit container. The content of the bit, either 0 or 1, is thereby determined depending on whether a signal is significantly present or not. Noise inherently reduces the accuracy of data transmission, so the present method may incorporate such techniques to reduce the impact of the noise when transmitting data across the bus or measuring the received data across the bus.

In another embodiment of the present invention, the devices on the controller area network interpolates at least one time marker between the zero-crossings of the power lines. These interpolated time markers are additionally used to determine the beginning and end of the bit containers for determining the data transmitted across the data bus. Increasing the number of interpolated time markers between each zero-crossing effectively increases the bandwidth of the controller area network across the data bus. Using these additional time markers, it is contemplated that additional methods of regulating the data bus to communicate across the said bus may be utilized, including square wave data.

The present invention is not limited in the means and method of bus arbitration. Any method of bus arbitration can be used to allow the various devices to communicate with one another including methods developed in the future.

BRIEF DESCRIPTION OF THE DRAWINGS

A more complete understanding of the method and apparatus of the present invention may be had by reference to the following detailed description when taken in conjunction with the accompanying drawings.

DETAILED DESCRIPTION OF THE INVENTION

Figure 1:
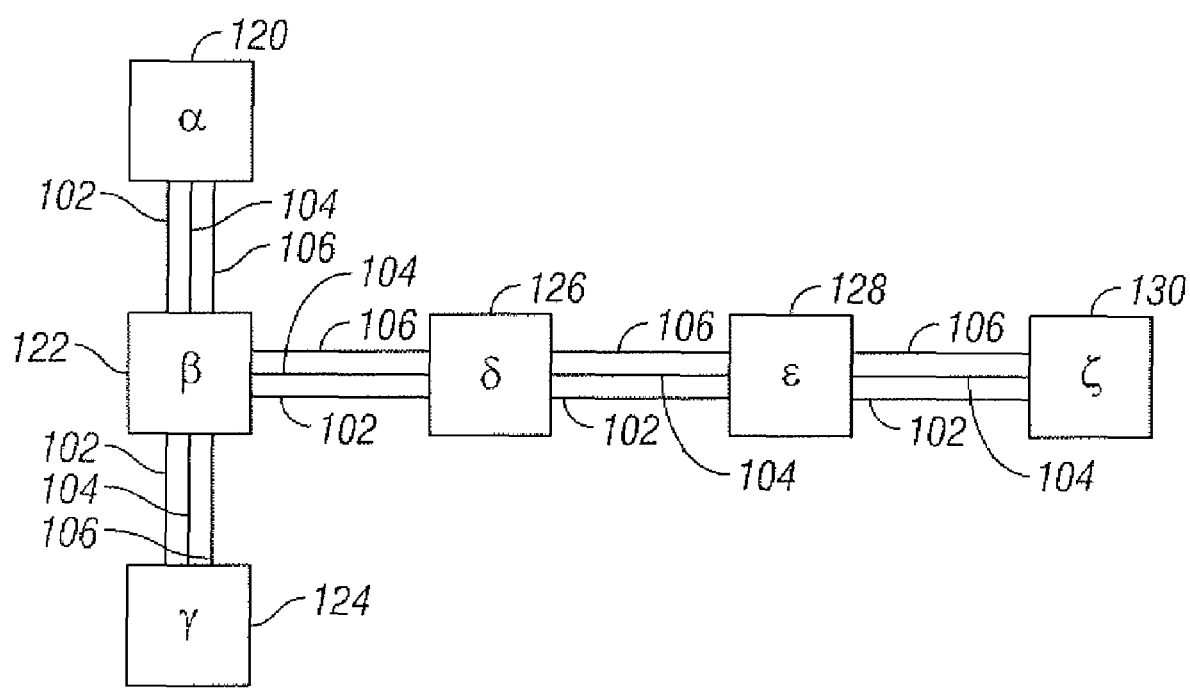
FIG. 1 depicts a typical controller area network with a number of devices connected in a combination of star and daisy-chain configurations.

Referring now to FIG. 1, a typical controller area network is shown. This type of controller area network depicted is the type of network contemplated as being suitable for the present invention. While the present detailed description describes the invention as applied to the Enviracom™ network system, it is further contemplated that the present invention may be applied to other types of communication systems that are similar in nature utilizing "bit containers" as described more fully herein.

FIG. 1 depicts a controller area network comprising six different devices. The devices are identified by numerals 120, 122, 124, 126, 128, and 130. Each device is connected to at least one other device within the network by three lines. The first two lines connecting the devices are power lines 102 and 104. The power lines 102 and 104 actually consist of a common line 104 (or neutral line) and an energized line 102 and the difference in voltage between these two lines provides the power (in the form of alternating current) that energizes the devices on the controller area network. Similarly, each device is also connected by a third line, a data line 106. The data lines 106 carry the data bits across the network of data lines which forms a data bus. Therefore, each device is connected to the data bus. Each device receives the same signal as every other device at any given time across the data bus. This enables two devices on opposite ends of the network, for example device α120 and device ζ130 to communicate across the data bus.

The method of arbitrating communication priorities is not modified in any way by the current invention. Bus arbitration involves the process of controlling which device is responsible for communicating at any given time. It is not possible to have multiple devices transmitting data bits at a single time as the resulting information would not be easily deciphered by the devices on the network. For this reason, almost every network that is comprised of more than two devices also has means for arbitrating the bus between the devices. The specific method and implementation of arbitrating the bus may be selected for each implementation from the methods known in the art. In some implementations, a single device on the network serves as the master controller for arbitrating communication across the data bus, but other decentralized methods for arbitration are also known.

Figure 2:
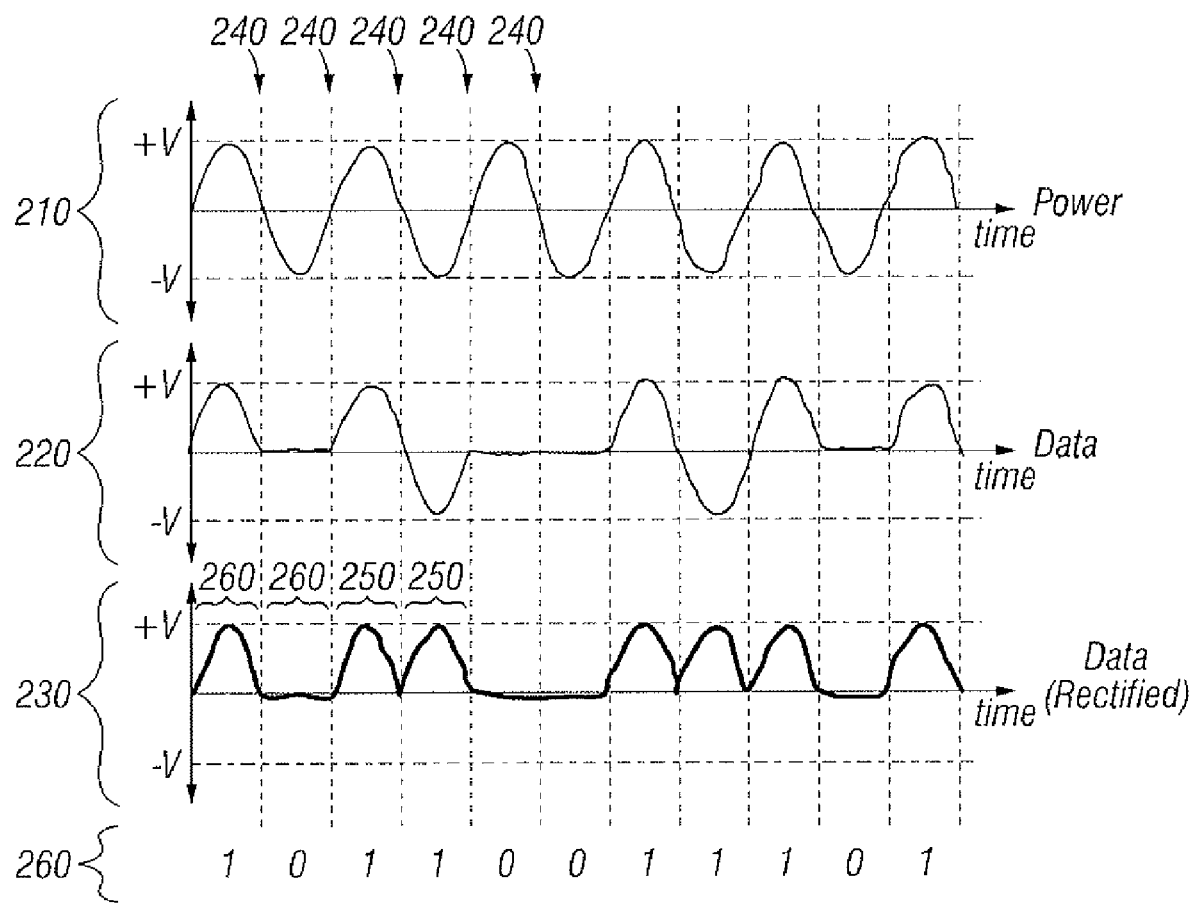
FIG. 2 depicts the waveforms of the power line and the data line of the present invention according to the prior art method.

Referring now to FIG. 2, the wave forms for the power 210 and data 220 are depicted. The power waveform 210 is a sinusoidal signal with a maximum amplitude of, for example, ±33.6 volts, corresponding to 24 Vac. The power waveform 210 is determined by measuring the voltage difference between the two power lines, one of which is a common line (or neutral). The common line, as described in FIG. 1, also serves as the common line for the data waveform 220 as depicted. The data waveform can have any maximum voltage, although for simplicity it may have the same amplitude as that of the power waveform 210.

The power waveform defines a plurality of zero-crossings 240. These zero-crossings 240 are where the sinusoidal signal cross the neutral voltage level, either rising or falling. The data waveform 220 is configured so as to correspond precisely in time to that of the power line, or at least within reasonable tolerances. Each consecutive pair of zero-crossings 240 defines a bit container 250 that is used to determine whether a transmitted bit is a one or a zero. To accomplish this, the data waveform is full-wave rectified to better analyze the contents of each bit container 250. The full-wave rectified data waveform 230 is depicted below the measured data waveform 220 so as to correspond to each other in time. The process of full-wave rectification is well-known in the art, but is not entirely necessary for implementation of the present invention if the appropriate measurements are taken of the data waveform 220, i.e. absolute measurement rather than true rectification followed by measurement. For purposes of illustration, the invention is described with reference to the full-wave rectified wave.

Each bit container 250 of the rectified waveform 230 is measured. If the average voltage of the waveform 240 within the bit container 250 is substantially high the bit is considered a one. Conversely, if the average voltage of the waveform 240 within each bit container 250 is substantially zero or extremely low, the bit container 250 is considered to hold a zero. This can be easily seen by referring to data bits 260 which depicts the contents of the bit containers 250 above each data bit. It is further contemplated that some implementations may interpret a substantially high voltage as a zero while a low voltage is a one depending on preference and design limitations.

Figure 3:
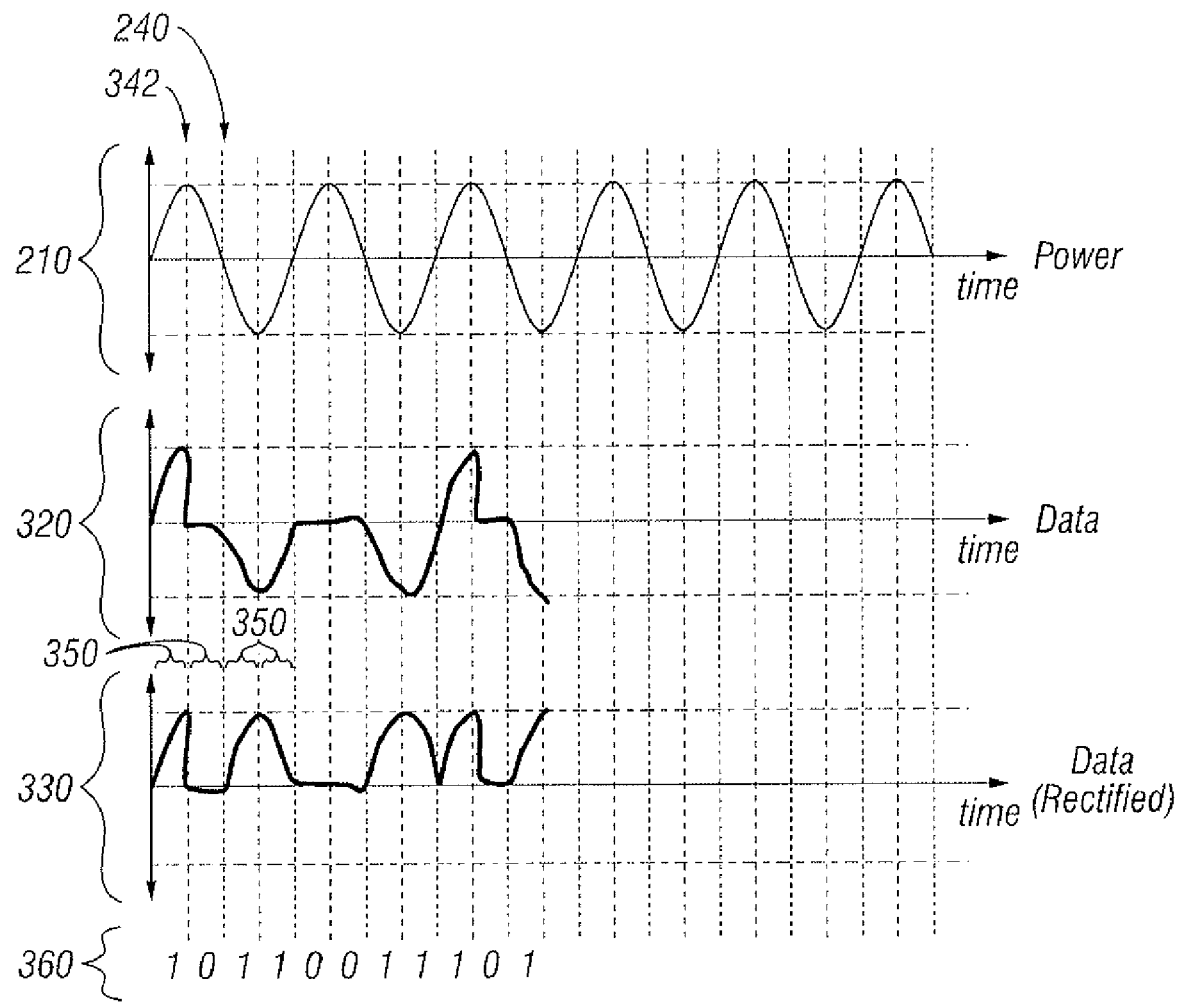
FIG. 3 depicts the waveforms of the power line and the data line of the present invention according to the present invention including the improvements described within the present application.

By now referring to FIG. 3, the improvement of the present invention can be best explained by visual means. In the present system, the power waveform 210 is a sinusoidal signal without any change from the system described in FIG. 2. The power waveform 210 still defines a number of zero-crossings 240 that are used to demarcate the beginning and end of the bit containers. However, in the present system, with only slight modification of the software and/or hardware within a device, it is simple to interpolate additional time points 342 that can be used to also make the beginning and/or end of a bit container. These additional time points 242 can be determined based on the average duration between two consecutive zero-crossings of the power waveform 210. For example, with a 60 Hz power waveform 210, the zero-crossings are approximately 8.33 microseconds apart and therefore the bit containers 240 of the prior art system are also 8.33 microseconds in duration. According to the present invention, the bit containers 250 of the prior art system can be further divided into higher resolution bit containers 350 by utilizing the interpolated time markers 342. It would be well within the capabilities of a person having ordinary skill in the art to further divide the bit containers into even higher resolution bit containers for even higher bandwidth across the data bus.

The high bandwidth data waveform 320 can be shown with the same bits encoded within the waveform as in FIG. 2 (10110011101). These bits are each encoded into the higher resolution bit containers 350. The full-wave rectified high resolution data waveform 330 is shown above the corresponding data bits 360 for illustration.

The present invention has been explained with reference to a preferred embodiment, but show not be limited in any way by the aforementioned description. The claim language below more accurately encompasses the scope of the invention as contemplated by the inventor.

We claim:

1. A system for communicating across a network comprising:
   at least two devices comprising the network;
   a pair of power lines connecting the at least two devices wherein the pair of power lines provides an alternating current;
   a data line connecting the at least two devices wherein the data line carries a plurality of bits at a data rate using a clocking signal; and
   wherein the clocking signal has a frequency that corresponds to a plurality of zero-crossings of the alternating current and one of the at least two devices is configured to provide at least one interpolated time marker between the zero-crossings to further increase the frequency of the clocking signal.

2. The system of claim 1 wherein the frequency of the clocking signal is doubled.

3. The system of claim 1 wherein the frequency of the clocking signal is increased by a integer multiple.

4. The system of claim 1 wherein the network is a controller area network.

5. The system of claim 4 wherein the at least two devices comprising the network are HVAC devices.

6. The system of claim 1 wherein the zero-crossings and the interpolated time markings are used to define bit containers.

7. The system of claim 1 wherein the one of the at least two devices is configured to provide multiple interpolated time markers between the zero-crossings.

8. A method for communicating between at least two devices on a controller area network using a pair of power wires and a data line comprising the steps of:
   detecting a plurality of zero crossings of an alternating current on the pair of power wires;
   generating a clock signal using the zero-crossings of the alternating current for providing power;
   providing at least one interpolated time marker between the zero-crossings to increase the frequency of the clock signal by a factor greater than 1; and
   detecting a plurality of bits transmitted on the data line using the clock signal.

9. The method of claim 8 wherein the frequency of clock signal is increased by a factor of two.

10. The method of claim 8 further comprising the step of determining a signal-to noise ratio of the data line and wherein the frequency of the clock signal is increased by a factor that is dependent on the detected signal-to-noise ratio measured.

11. The method of claim 8 wherein the zero-crossings and the interpolated time markings are used to define bit containers.

12. The method of claim 8 wherein the providing includes providing multiple interpolated time markers between the zero-crossings.

* * * * *